United States Patent [19]

Howlett

[11] Patent Number: 5,078,343

[45] Date of Patent: Jan. 7, 1992

[54] OXYGEN SUPPLY UNIT

[75] Inventor: Anthony S. Howlett, Slough, England

[73] Assignee: Kidde-Graviner Limited, Derby, England

[21] Appl. No.: 599,702

[22] Filed: Oct. 18, 1990

[51] Int. Cl.⁵ .............................................. A62B 7/04
[52] U.S. Cl. .......................... 244/118.5; 128/205.25; 128/204.29
[58] Field of Search ................. 244/118.5; 128/204.18, 128/204.26, 204.27, 204.29, 205.13, 205.17, 205.25

[56] References Cited

U.S. PATENT DOCUMENTS

| | | | |
|---|---|---|---|
| 3,073,301 | 1/1963 | Hay et al. | 128/205.25 |
| 3,981,302 | 9/1976 | Veit | 244/118.5 |
| 4,559,939 | 12/1985 | Levine et al. | 128/205.25 |
| 4,609,166 | 9/1986 | Brennan | 244/118.5 |
| 4,909,247 | 3/1990 | Terrisse et al. | 128/204.29 |

Primary Examiner—Joseph F. Peters, Jr.
Assistant Examiner—Linda L. Palomar
Attorney, Agent, or Firm—Leydig, Voit & Mayer

[57] ABSTRACT

An oxygen supply system for use in an aircraft has four check valves (19) each having an inlet connected to a source of oxygen, and an outlet connected by a flexible hose (17) to a face mask (13). The check valve (19) associated with each face mask has a detachable pin (26) forming part of a collar (27) which embraces the hose (17) and is tethered to a looped section (29) of the hose. When the pin is detached from the check valve, by pulling the face mask down, oxygen is supplied to the mask.

6 Claims, 3 Drawing Sheets

OXYGEN SUPPLY UNIT

BACKGROUND OF THE INVENTION

This invention relates to an oxygen supply unit for installation in an overhead panel above a row of seats in the passenger cabin of an aircraft.

A known oxygen supply unit includes a number (typically four) of face masks which are normally housed, in a stowed condition, inside a casing located in the overhead panel.

Each mask is connected to a source of oxygen by a respective supply line, comprising a flexible hose and a so-called check valve which is used to exercise control over the flow of oxygen to the mask. When the unit is inoperative (i.e. when a supply of oxygen is not required) a removable pin, received in a hole in the body of the check valve, retains a valve member thereof in the closed condition, thereby preventing oxygen from being supplied to the mask. In the event of an emergency, occasioned, for example, by a pressure drop in the passenger cabin, a pivotal cover of the casing is caused to open. This enables the masks within the casing to drop down to assume a deployed position whereby to be accessible to passengers occupying the seats below the unit. Each removable pin is tethered to a respective flexible hose by means of a lanyard or cord so that when a face mask is grasped by a passenger and pulled down to his face, the pin, tethered to the associated hose, is withdrawn from the check valve allowing oxygen to flow to the mask.

Existing oxygen supply units have the disadvantage that the pin associated with one mask could be fitted inadvertently to the check valve connected to a different mask. In these circumstances, when the pin is withdrawn from the (incorrect) check valve, oxygen would not be supplied to the intended mask. Clearly, this could have dire consequences.

SUMMARY OF THE INVENTION

According to the invention, there is provided an oxygen supply unit for installation in the cabin of an aircraft, comprising at least two check valves each being arranged to control a supply of oxygen to an associated face mask via a respective flexible hose, wherein each check valve has a removable latch member for causing the check valve respectively to prevent and allow a flow of oxygen to the associated face mask when the latch member is fitted to and removed from, the check valve, the latch member for each check valve being so coupled to the respective flexible hose a to prevent that latch member being fitted to any other check valve.

This arrangement ensures that a supply of oxygen will always be delivered to the correct mask.

Preferably the removable latch member for each check valve includes a collar which is disposed around the respective flexible hose.

The removable latch member may further include a pin which projects from the collar and is co-operable with the check valve to prevent said flow of oxygen.

The collar may be tethered to the flexible hose by a lanyard or cord.

The oxygen supply unit may include a manifold having an inlet connectable to a supply of oxygen, and a respective outlet coupled to each check valve.

DESCRIPTION OF THE DRAWINGS

An oxygen supply unit in accordance with the invention is now described, by way of example only, with reference to the accompanying drawings, in which.

DESCRIPTION OF PREFERRED EMBODIMENT

Figure 1:
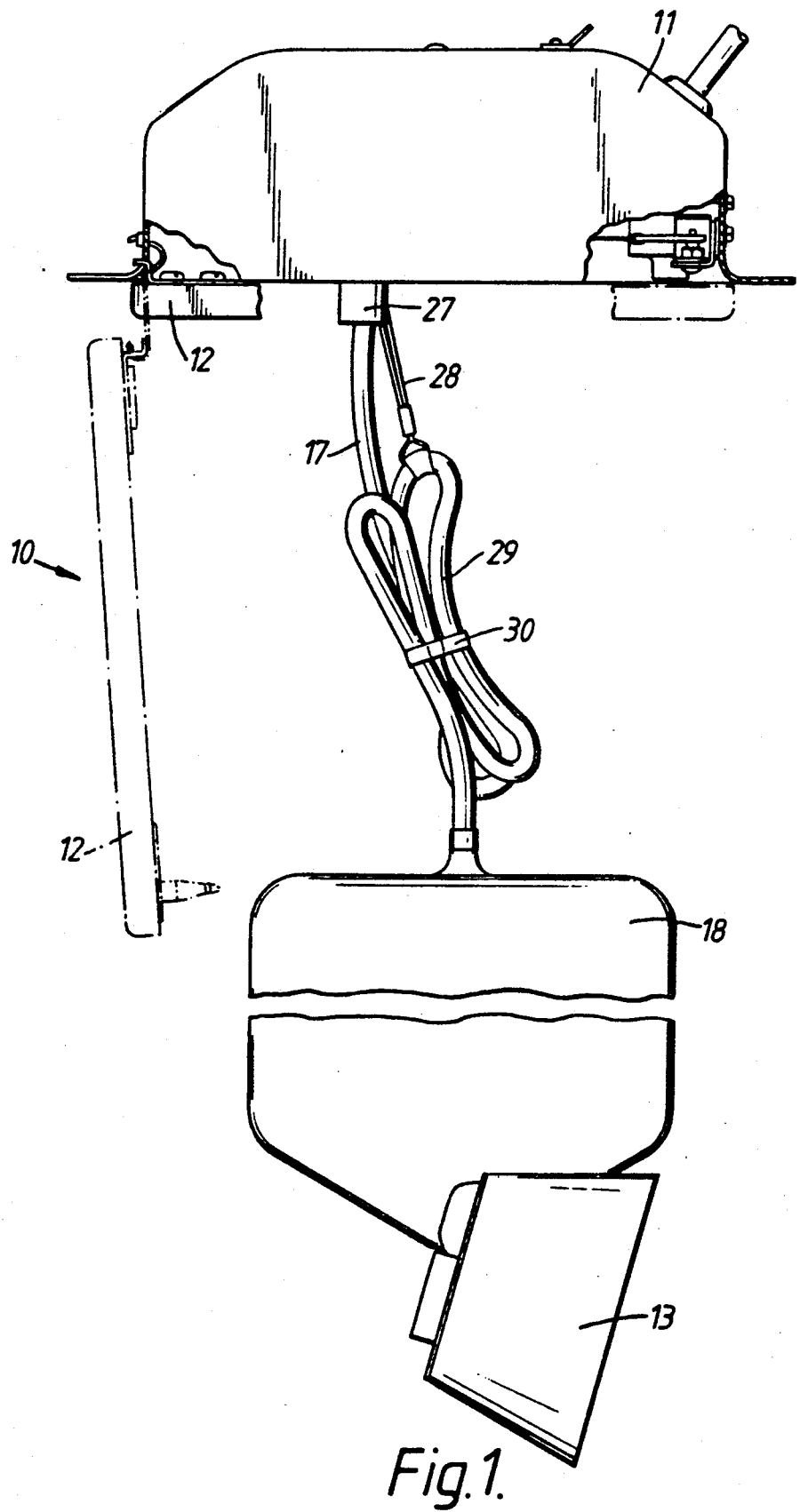
FIG. 1 is a side elevation view of the oxygen supply unit showing a face mask in the deployed position.
Figure 2:
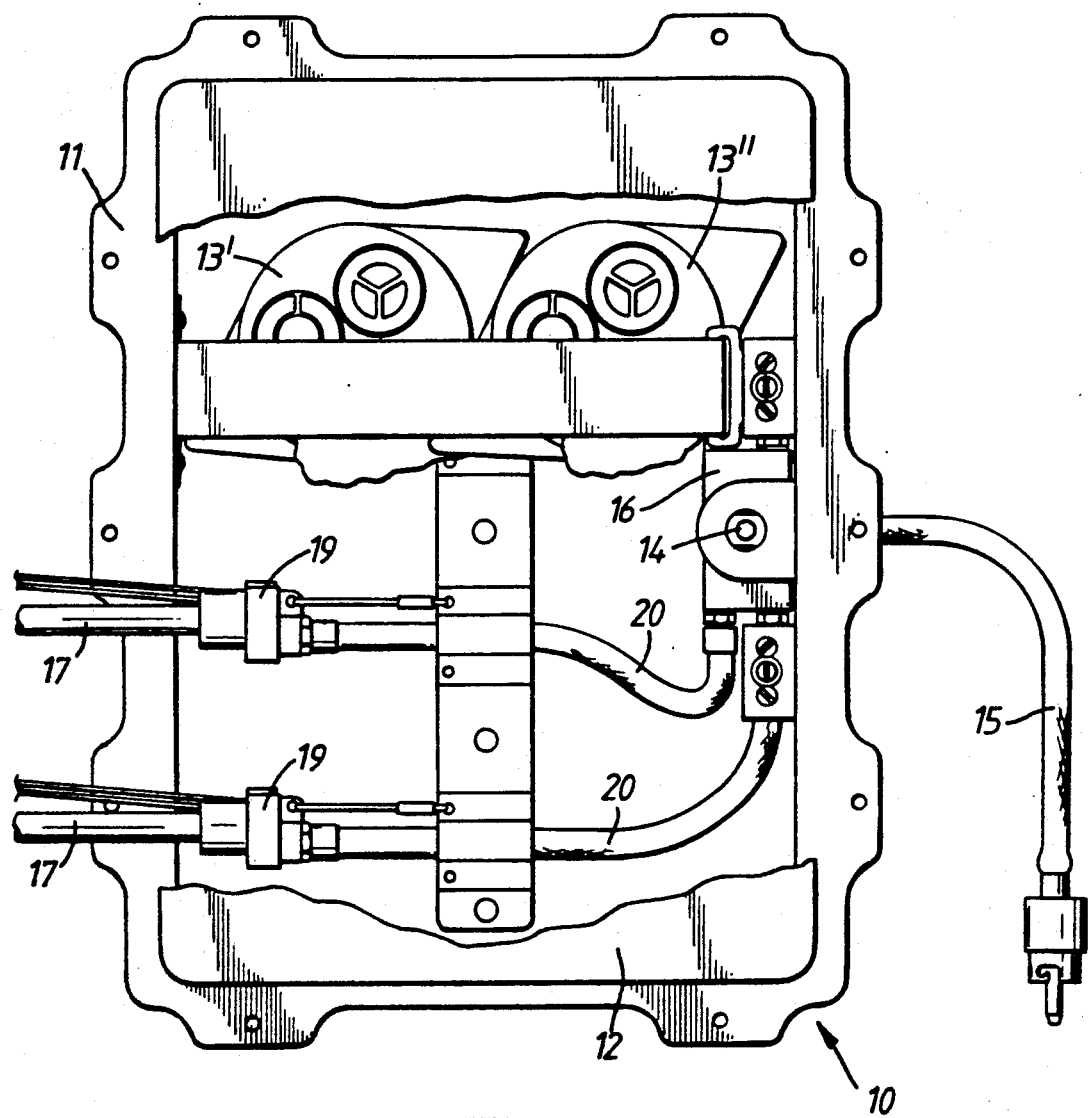
FIG. 2 is an underplan, part cut-away view of the oxygen supply unit showing two of the face-masks in the stowed condition.

The oxygen supply unit shown at 10 in FIGS. 1 and 2 is intended to be installed in an overhead panel above a row of seats in the passenger cabin of an aircraft.

Referring to FIGS. 1 and 2, the unit comprises a casing 11 having a pivotal cover 12 which faces the seats below. The casing houses a plurality (four in this example) of face masks 13 each being allocated to a respective seat and being connected to a source of oxygen.

Normally, the face masks are contained within the casing in a stowed condition, as illustrated in FIG. 2 by the masks referenced 13' and 13".

However, in the event of an emergency, as a result of a pressure drop in the cabin for example, a piston actuator 14 forces the cover 12 open (to the position shown in broken outline in FIG. 1) enabling the face-masks to drop down to the deployed position shown in FIG. 1, where they are accessible to passengers occupying the seats below the unit.

The unit has a main supply line 15 which is connected to a manifold 16 in order to distribute oxygen to each face mask via a respective subsidiary supply line.

Each subsidiary supply line consists of the series arrangement of a flexible hose 17 which is connected to an accumulator bag 18 associated with the respective face mask, a check valve 19 and a connecting hose 20 attached to a respective outlet of the manifold.

Figure 3:
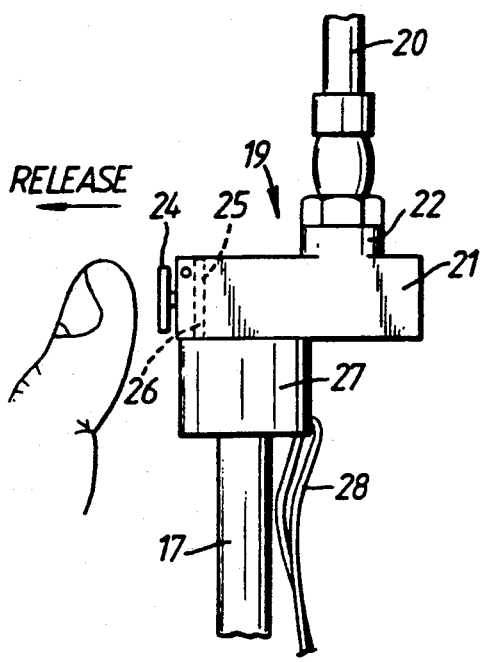
FIGS. 3 and 4 show detailed side elevation views of a check valve.
Figure 4:
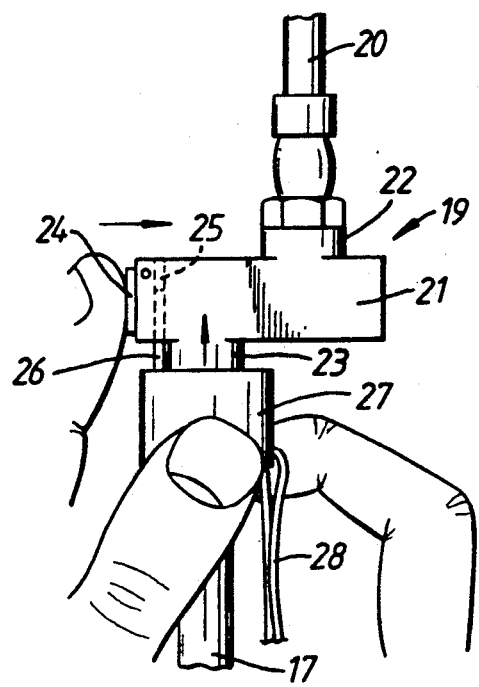
Figure 5:
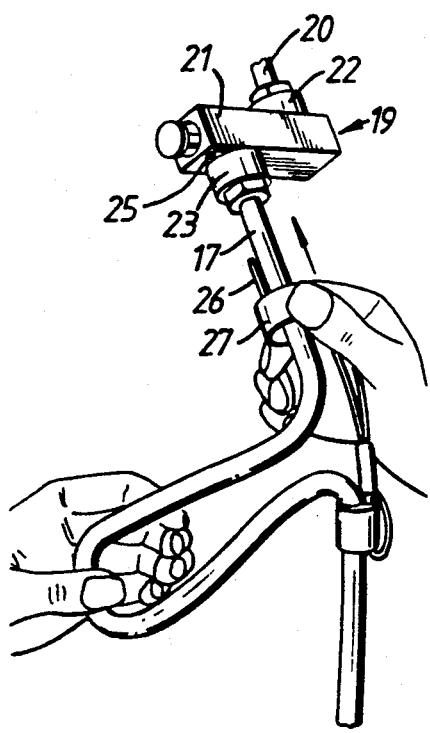
FIG. 5 illustrates the manner by which the latch member is fitted to the check valve.

The check valve, which is shown in greater detail in FIGS. 3 to 5, comprises a valve body 21 having an inlet 22, connected to the connecting hose 20, and an outlet 23 connected to the flexible hose 17, and a spring-loaded valve member 24 which can be displaced relative to the valve body to exercise control over a flow of oxygen to the respective face mask.

The valve body 21 is provided with a hole 25 and the valve member 24 is provided with a location groove (not shown) in order to receive a removable latch member in the form of a pin 26 which acts to retain the valve member in the closed condition whereby to block a flow of oxygen through the valve.

To that end, the valve member is pressed into the valve body (as shown in FIG. 4), in opposition to the spring force acting thereon, in order that the pin can be received in the hole and the location groove.

The pin 26 projects from a collar 27 which is tethered by a lanyard or cord 28 to a looped section 29 of hose 17, as shown in FIG. 1. The loops of this section of hose are held in place by a suitable retainer clip 30.

Figure 6:
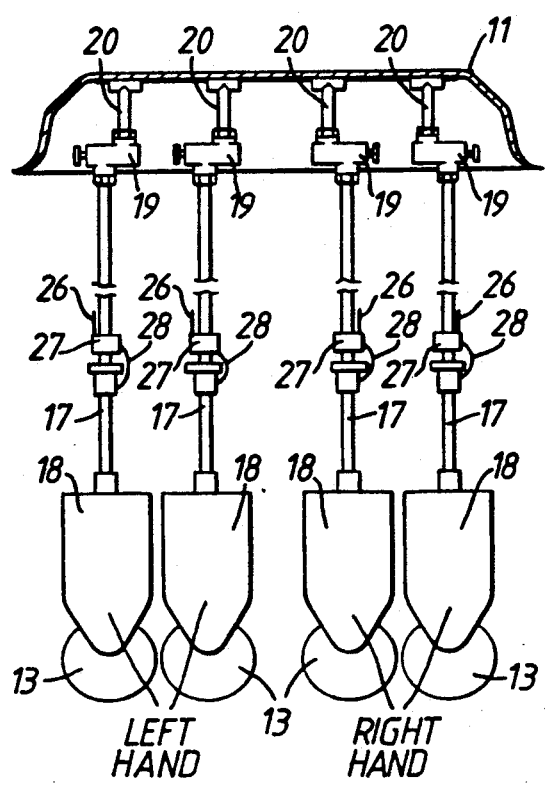
FIG. 6 illustrates the position of the face masks when a supply of oxygen is being delivered.

When the face mask is gripped by a passenger and pulled down to his face, the respective pin 26 is withdrawn from receiving hole 25 in the valve body 21 and the location groove in the valve member, as shown in FIG. 6, allowing the valve member 24 to assume the open condition and oxygen to be supplied to the face mask.

As shown in FIG. 5, collar 27 is disposed around the associated flexible hose 17 to which it is tethered. Thus, when the pin 26 is being fitted to the valve body 21 the collar is constrained to move along the hose, in close proximity thereto. Accordingly, with this arrangement, it is not possible for the pin to be fitted to the check valve connected to a different face mask, thereby ensuring that oxygen will always be supplied to the correct mask when the pin is subsequently withdrawn.

I claim:

1. An oxygen supply unit for installation in the cabin of an aircraft, comprising at least two check valves each being arranged to control a supply of oxygen to an associated face mask via a respective flexible hose, wherein each check valve has a removable latch member for causing the check valve respectively to prevent and allow a flow of oxygen to the associated face mask when the latch member is fitted to, and removed from the check valve, the latch member for each check valve being so coupled to the respective flexible hose as to prevent that latch member being fitted to any other check valve.

2. An oxygen supply unit is claimed in claim 1, wherein the removable latch member for each check valve includes a collar which is disposed around the respective flexible hose.

3. An oxygen supply unit as claimed in claim 2, wherein the collar of each latch member is tethered to the respective flexible hose by a lanyard or cord.

4. An oxygen supply unit as claimed in claim 1, including a manifold having an inlet connectable to a source of oxygen, and a respective outlet coupled to each check valve.

5. An oxygen supply unit for installation in the cabin of an aircraft, comprising at least two check valves each being arranged to control a supply of oxygen to an associated face mask via a respective flexible hose, wherein each check valve has a removable latch member for causing the check valve respectively to prevent and allow a flow of oxygen to the associated face mask when the latch member is fitted to, and removed from the check valve, the removable latch member for each check valve being so coupled to the respective flexible hose as to prevent that latch member being fitted to any other check valve, the latch member including a collar which is disposed around the respective flexible hose and further including a pin which projects from the collar and is co-operable with the check valve to prevent said flow of oxygen.

6. An oxygen supply unit as claimed in claim 5 wherein the collar of each latch member is tethered to the respective flexible hose by a lanyard or cord.

* * * * *